United States Patent [19]

Webster

[11] 4,354,876

[45] Oct. 19, 1982

[54] UTILIZATION OF DRY SCRUBBER WASTE MATERIALS

[75] Inventor: William C. Webster, Norristown, Pa.

[73] Assignee: Webster & Assoc. Ltd., Norristown, Pa.

[21] Appl. No.: 191,065

[22] Filed: Sep. 26, 1980

[51] Int. Cl.$^3$ ............................................. C04B 1/00

[52] U.S. Cl. ...................... 106/85; 106/97; 106/105; 106/109; 106/118; 405/128; 405/129; 405/263; 405/266

[58] Field of Search ............ 106/85, 97, DIG. 1, 106/105, 109, 118, 121; 423/244; 260/29.6 S; 405/128, 129, 263, 266

[56] References Cited

U.S. PATENT DOCUMENTS

| | | | |
|---|---|---|---|
| Re. 29,783 | 9/1978 | Smith et al. | 106/109 |
| 1,942,769 | 1/1934 | Peffer et al. | 106/DIG. 1 |
| 2,382,155 | 8/1945 | Jones et al. | 106/118 |
| 2,803,556 | 8/1957 | Carlsson et al. | 106/98 |
| 2,948,948 | 8/1980 | Duplin et al. | 106/DIG. 1 |
| 2,987,406 | 6/1961 | Minnick | 106/97 |
| 2,987,408 | 6/1961 | Minnick | 106/98 |
| 2,987,411 | 6/1961 | Minnick | 106/288 B |
| 2,991,014 | 7/1961 | Minnick | 239/2 |
| 3,076,717 | 2/1963 | Minnick | 106/118 |
| 3,192,060 | 6/1965 | Tilsen | 106/97 |
| 3,206,319 | 9/1965 | Minnick | 106/119 |
| 3,230,103 | 1/1966 | Minnick | 106/117 |
| 3,341,341 | 9/1967 | Carson et al. | 106/98 |
| 3,561,050 | 2/1971 | Danforth | 264/117 |
| 3,634,115 | 1/1972 | Minnick | 106/85 |
| 3,753,620 | 8/1973 | Minnick | 404/76 |
| 3,781,408 | 12/1973 | Lin | 423/244 |
| 3,785,840 | 1/1974 | Minnick et al. | 106/118 |
| 3,851,042 | 11/1974 | Minnick | 423/244 |
| 3,852,084 | 12/1974 | Webster et al. | 106/118 |
| 3,854,968 | 12/1974 | Minnick et al. | 106/109 |
| 3,855,125 | 12/1974 | Lin | 210/46 |
| 3,859,799 | 1/1975 | Jaco | 210/42 |
| 3,861,930 | 1/1975 | Lin | 106/109 |
| 3,870,535 | 3/1975 | Minnick et al. | 106/118 |
| 3,962,080 | 6/1976 | Dulin et al. | 106/DIG. 1 |
| 4,049,462 | 9/1977 | Cocozza | 106/109 |
| 4,054,463 | 10/1977 | Lin | 106/109 |
| 4,120,738 | 10/1978 | Tate | 106/DIG. 1 |
| 4,153,655 | 5/1979 | Minnick et al. | 264/8 |
| 4,171,951 | 10/1979 | Lin | 432/77 |
| 4,173,610 | 11/1979 | Huller et al. | 264/28 |

OTHER PUBLICATIONS

Vuceta et al., Characteristics and Disposal of Solid By-Products From Dry Gas Desulfurization Systems, 73rd Ann. Meeting of Air Pollution Control Assns., Montreal, Quebec, Jun. 22-27, 1980.

Ellison et al., By-Product-Utilization/Ultimate Disposal of Gas Cleaning Waste From Coal-Fired Power Generation, Proceedings/Symposium of FGD, Mar. 1979, pp. 1187-1203.

Phillips, An Evaluation of the Waste Product From a Calcium Based Dry Flue Gas Desulfurization System, M. S. Thesis, U. of Ten., Knoxville, Jun. 1979.

Blythe et al., Survey of Dry SO$_2$ Control Systems, EPA-600/7-80, Feb. 1980, pp. 15-19.

Minnick, "Development of Potential Uses for the Residue From Fluidized Bed Combustion Processes", (DO-E/ET/10415-39).

*Primary Examiner*—James Poer
*Attorney, Agent, or Firm*—Schuyler, Banner, Birch, McKie & Beckett

[57] ABSTRACT

Cured compacted products suitable for use as landfill materials, embankments, roadbase compositions and the like are produced by the described method from fly ash-containing waste materials obtained by a lime based dry scrubbing flue gas desulfurization operation. In this method the dry fly ash-containing waste powder, which also contains calcium sulfite or sulfate reaction products and unreacted lime, is contacted with a predetermined amount of water and mixed under critical mixing conditions to provide a powder/water mixture which is placed at a suitable utilization site, e.g., a landfill disposal site, and compacted under sufficient load to achieve at least about 70% of the laboratory dry density. The resulting products have compressive strengths after curing of at least about 25 psi and permeabilities of less than $1 \times 10^{-5}$ cm/sec.

38 Claims, 3 Drawing Figures

(300×)

FIG. 2B (1000 X)

UTILIZATION OF DRY SCRUBBER WASTE MATERIALS

The present invention relates to a process for handling cementitious waste products obtained from the desulfurization of flue gases produced in the combustion of coal. More specifically, this invention relates to the processing and preparation of unique materials from the fly ash-containing powder produced in a lime-based dry scrubbing process for removal of fly ash and $SO_2$ from flue gases.

Among the products of coal combustion, fly ash and the acid gases, primarily sulfur dioxide, in the flue gas are the major causes of air pollution. Flue gas cleaning systems presently employed produce large quantities of solid waste which include recovered fly ash and sulfur-containing reaction products from scrubbing operations. The worldwide shortage of oil and gas for heating and power generation is causing a shift to coal burning, with a resultant increase in the production of these solid wastes. It has been established that some 73 million metric tons of fly ash and some 22 million metric tons of flue gas desulfurization sludge will be produced in the U.S. by the year 1986. Disposing of this mass of material is costly, requires land, and causes secondary environmental problems that must be dealt with to avoid pollution of groundwaters and loss of land values.

Solid wastes from coal combustion systems include two basic types, namely, those removed by dry collection upstream or downstream of the $SO_2$ scrubber, or collected in the scrubber itself, and scrubber waste, usually as sludge. Wet scrubbers can be categorized as either throw-away or recovery. The most common process, the single closed-loop throw-away, disposes of its waste after reclaiming a certain portion of the water which is recycled to the scrubber to maintain water balance. The double-loop throw-away process, called dual-alkali, uses one loop to recirculate scrubber reagent and another loop to regenerate this reagent and remove waste sludge.

The one thing all wet scrubbing flue gas cleaning systems have in common is the generation of a calcium sulfite/calcium sulfate sludge, with a low solids content and a limited structural load-bearing capability. This sludge is fine-grained and highly water retentive. After settling, it will solidify somewhat, but it reverts to a fluid consistency when disturbed. Sludge solids contain leachable and potentially toxic salts and the dissolved salts in the waste water occluded in the sludge contain trace quantities of soluble heavy metal elements from the coal used as fuel.

There is a great deal of prior art describing various methods for handling wet scrubber waste materials—i.e., the high water slurry. Many of these prior art processes require complex and time consuming dewatering steps and utilize the waste materials with or without additives to form landfill masses, roadbase compositions and the like. See, e.g., Minnick, U.S. Pat. No. 3,785,840. Another commonly employed method for disposal of wet scrubber sludges involves simply forwarding this slurry to a settling pond, where the slurry gradually settles but does not exhibit any appreciable hardening or structural characteristics.

Conventional fly ash, such as removed from the flue gas of pulverized coal boilers burning bituminous coal is generally used or disposed, when proper controls are used, without great difficulty. Approximately 25 percent of such ash produced in the United States is used in compositions such as Portland cement (raw mix or blend), concrete, roadbase, mineral filler for asphalt, embankments and the like. The unused ash is disposed, either by sluicing to a pond or by placing in a landfill. The ash is not self-hardening. When used as a pozzolan in cementitious compositions, the siliceous and aluminosiliceous components of the ash can react with lime which is present in the cementitious compositions. When disposed, this material is relatively free draining.

Fly ash from subbituminous and lignite coals is often very reactive, exhibiting self-hardening properties due to the presence of calcium oxide, calcium sulfate, and other materials in the fly ashes, making their disposal and use difficult. The ashes give off heat and harden quickly when mixed with water. For example, if the material is dampened and placed in open trucks for delivery to the disposal site, it is often nearly impossible to remove the ash from the trucks, and proper placement and compaction in a landfill cannot be achieved in such cases.

The primary reaction chemistry involved in the rapid hardening phenomenon of these fly ashes is reasonably well understood. When the ash is mixed with water, calcium oxide and calcium sulfate present in the ash hydrate to form calcium hydroxide and gypsum and these products also react with the alumina present in the fly ash to form ettringite (calcium sulfo-aluminate hydrate). The reactions proceed quickly in the subbituminous and lignite fly ashes, causing rapid temperature rise and hardening, in many ways resembling the flash set characteristics of improperly calcined or regulated Portland cement. Bituminous fly ashes, on the other hand, normally contain very limited quantities of calcium oxide and calcium sulfate, and these fly ashes do not possess rapid hardening characteristics.

The advent of the dry scrubbing system for $SO_2$ and fly ash removal from flue gases represents a major advance in the art of pollution control. It has been estimated that dry scrubbing systems will occupy a major role in $SO_2$ and fly ash removal from the some 200,000 megawatts of coal burning capacity which is expected to be added to the U.S. electric utility systems by 1990. Dry scrubbing systems are unique in that a dry waste is produced by the reaction of $SO_2$ with calcium oxide and other metal oxides present in the system. A powder is produced in the dry scrubbing system, as contrasted to a high water content, low solids content waste product produced in wet scrubbing systems. The dry scrubbing waste powder is still produced in large quantities, and, therefore, it would be extremely desirable to provide a process for economically disposing of this waste.

It has been discovered that the disposal and utilization products of the present invention differ substantially and critically from the fly ash and wet scrubbing products of the prior art. The highly reactive fly ashes known to the prior art are conditioned by means of the dry scrubbing operation such that the compositions of the present invention can be made and used without difficulties arising from the rapid reaction chemistry of those ashes, as more fully described below. Nonreactive dry scrubber powders, even though they are known to contain free lime and silica, may not self-harden and they may require further modification in order to be used in the cementitious compositions described herein.

Accordingly, it is an object of this invention to economically dispose of the solid fly ash-containing waste materials from the dry $SO_2$ scrubbing of flue gases from coal combustion in a manner which takes full advantage of its latent cementitious properties to produce a useful product having improved properties.

It is also an object of the present invention to provide a dry scrubber waste material having excellent strength and permeability properties when employed as a compacted landfill material.

It is a further object of the present invention to provide a dry scrubber waste product which has suitable strength and permeability properties for use in structural landfill applications, e.g., embankments and the like.

Still another object of the present invention is to provide a dry scrubber waste product which is useful either alone or without additives for producing road-base composition materials.

These and other objects of the present invention are accomplished by providing a process for preparing a cured compacted product from dry flue gas scrubbing waste materials, the process comprising the steps of providing a substantially dry fly ash-containing powder obtained from the dry scrubbing of fly ash-containing flue gas with lime, the fly ash-containing powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof; contacting the fly ash-containing powder with a predetermined amount of water to produce a powder/water mixture; mixing the powder/water mixture in a manner and for a time sufficient to produce a uniform distribution of the water without the formation of large agglomerates or a sticky plastic mass; placing the mixture in the desired configuration at the utilization site; compacting the placed mixture within a predetermined time subsequent to the contacting step to a density of at least about 70% of the laboratory dry density of the mixture; and curing the compacted material in place to form the compacted product.

The present invention also provides a cured compacted product made from material which comprises a fly ash-containing powder, the powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide, and mixtures thereof, the product exhibiting after curing a compressive strength of at least about 25 psi, a compacted dry density of from about 55 to about 95 pounds per cubic foot, and a permeability of less than about $1 \times 10^{-5}$ cm/sec.

The powders produced by dry scrubbing of fly ash-containing flue gases differ materially from both separately recovered fly ashes and from wet scrubber sludges which contain fly ashes. As a result of the unique processing steps employed in the dry scrubbing process described below, the resulting waste powders have been unexpectedly found to possess latent bonding reactivity that is fundamentally different than that existing in conventional fly ashes or mixtures of fly ashes and conventional wet process sludges. The process of the present invention is designed and carefully controlled to produce products which take full advantage of these unique self-bonding capabilities.

Waste powders from the dry scrubbing of fly ash-containing flue gases wherein the scrubbing involves recycle of fly ash-containing dry powders back through an aqueous feed preparation step results in a unique powder structure. These powders comprise, as a major portion, conglomerates of fly ash with absorption reactants and reaction products. In the preferred form the waste powder resulting from a spray dryer-absorber dry scrubbing operation comprises a fly ash particle coated with myriad of microparticulate crystallites of unreacted absorbent, i.e., lime and absorption reaction products such as calcium sulfite and sulfate in various degrees of hydration. The fly ash particles themselves contain latent, water reactive, cementitious materials including alkali metal oxides, iron oxides, alumina and silica. The instant and ultimate self-bonding properties of various fly ash-comprising flue gas desulfurization products are critically dependent on the manner and extent of water involvement and physical means of mixing and handling used to process these materials for utilization. The present invention is based at least in part on the discovery of the processing and handling conditions necessary to achieve preferred materials from this unique waste product.

In the drawings which illustrate the preferred embodiments of the present invention:

As used throughout the instant specification and claims, the term fly ash is intended to refer primarily to flue gas-entrained ash from the combustion of coal. The term lime is intended to refer both to calcium oxide (CaO) and its hydrated form, calcium hydroxide (Ca(OH)$_2$).

One of the primary components of the waste product being disposed of according to the present invention is fly ash. Fly ash from coal combustion occurs as spherical particles, usually ranging in diameter up to 100 microns. The chemical makeup of fly ash can vary widely depending on the geologic and geographic factors affecting the coal deposit and on the combustion conditions. Coal can be classified under the ASTM ranking system as anthracite, bituminous, subbituminous and lignite. Fly ashes from each of these ranks usually contain as major constituents $SiO_2$, $Al_2O_3$ and $Fe_2O_3$. Some ashes, particularly those from subbituminous or lignite coals can contain significant quantities of CaO. Various fly ash materials may also contain minor constituents such as magnesium, titanium, sodium, potassium, sulfur and phosphorous and may further contain trace concentrations of from about 20 to 50 additional elements.

Figure 1:
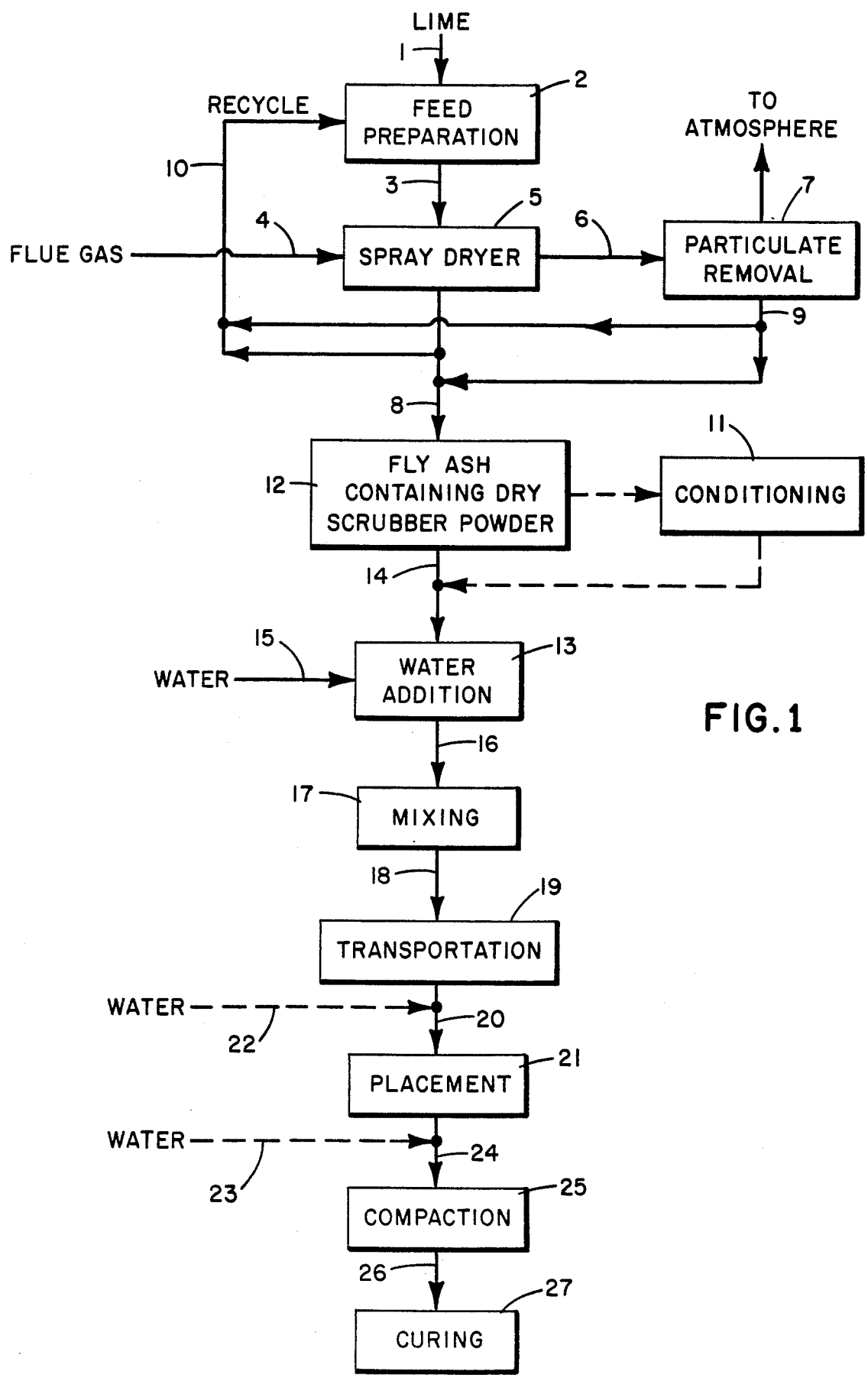
FIG. 1 is a flow diagram of one form of the process of the present invention.

One preferred form of the process for producing the fly ash-containing dry scrubber powder is shown in FIG. 1. In the illustrated embodiment, calcium hydroxide 1 is mixed with water in a slurry tank 2 to provide an aqueous feed suspension 3. This feed suspension is then atomized in a stream of hot, fly ash-containing flue gas 4 in a drying chamber 5 to effect substantial drying of the resulting atomized droplets and partial absorption of the sulfur dioxide in the flue gas. A portion of the resulting dry powder comprising fly ash, reaction products and unreacted materials 6 is passed along with the flue gas to a particulate removal device 7 in which further reaction may take place. A first portion 8 of the free flowing dry powder produced in the drying chamber is collected directly from the bottom of this chamber, and a second portion 9 of the powder is collected from the bottom of the particulate removal device. Finally, a portion of said fly ash-containing powder 10 is recycled for preparation of the aqueous feed suspension. The drying and sulfur dioxide absorption are effected while maintaining the temperature of the flue gas leaving the drying chamber at from about 8° to 40° C. above the adiabatic saturation temperature of the gas by controlling the amount of feed suspension forwarded to the drying chamber and the total solids content of the feed suspension in response to the amount, temperature, and moisture content of the flue gas feed to the drying chamber. More details of this preferred dry scrubbing process can be obtained from commonly assigned U.S. application Ser. No. 039,892, filed May 17, 1979, now U.S. Pat. No. 4,279,873, which is hereby incorporated by reference. Other dry scrubbing processes may be used as long as they produce a fly ash-containing waste powder as hereinafter described.

Figure 2A:
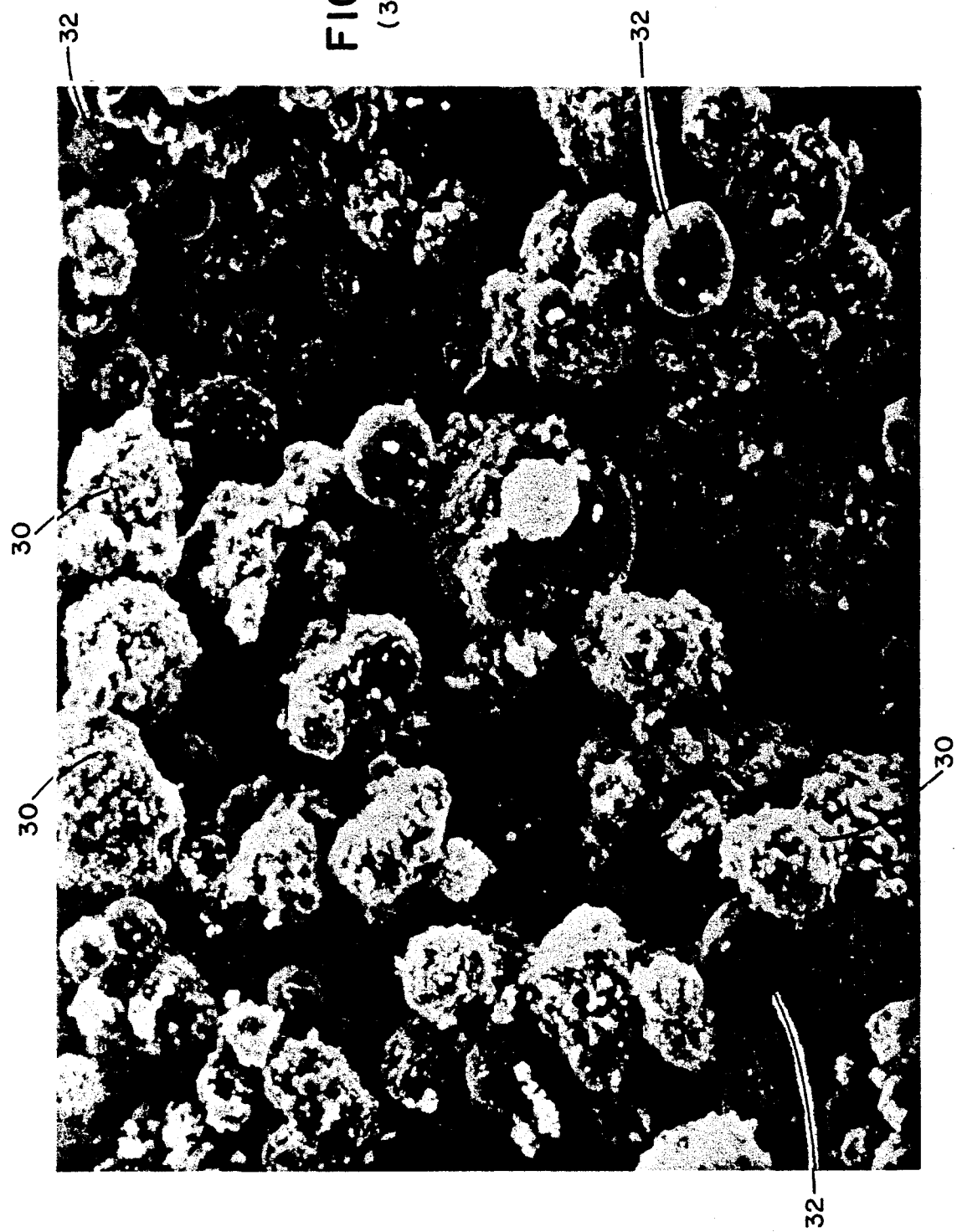
FIG. 2 is a series of photomicrographs showing the physical characteristics of a dry scrubber waste powder to which the disposal process of the present invention is applicable.

In general, the dry waste powder obtained from the above-described dry scrubbing process is predominately fly ash particles coated with the reaction products and unreacted reagent. A small percentage of the powder (up to about 10-15%) may comprise fly ash particles which appear substantially unchanged by the scrubbing reaction; a small percentage of reaction materials unassociated with fly ash may also be present. The fly ash particles include those captured directly from incoming flue gas and those recycled through the reagent preparation procedure at least once. Reference to the series of photomicrographs in FIG. 2 (FIG. 2A is at 300X; FIG. 2B is at 1000X) shows the coated fly ash particles 30 and the apparently unchanged fly ash particles 32. FIG. 2 clearly shows the microparticulate nature of the reaction material crystallites on the surface of each individual fly ash particle. Since these crystallites are formed in a very short time in the spray drying-/absorption step, there is very little time for well ordered large crystal growth. The reactivity characteristics of the powders used according to the process of the present invention is believed to be due, at least in part, to this unique physical structure.

The gross composition of this dry scrubber powder will vary with the nature of the coal burned and its resultant ash, with the amount of scrubbing reagent, and with the conditions of the scrubbing operation. Broadly speaking, the powder comprises fly ash, scrubbing reaction products, primarily calcium sulfite and calcium sulfate, and unreacted reagent lime as either CaO or Ca(OH)$_2$. Some CaO may react to form calciumaluminosilicate hydrates or similar compounds on the surface of fly ash particles during scrubbing or reagent preparation.

In general, the dry scrubber waste powder useful according to the present invention comprises by weight from about 10 to 85% fly ash; from about 10 to 60% CaSO$_x$ (various forms, including calcium sulfite hemihydrate, and the dihydrate, hemihydrate and anhydrite of calcium sulfate-depending primarily on the temperatures in the absorber and collection system); from about 1-30% unreacted lime (primarily as Ca(OH)$_2$); and up to about 7% free water. A preferred analysis of such a powder based on a low-sulfur western coal ash is as follows:

| | |
|---|---|
| Fly ash | 70-80% |
| CaSO$_x$ | 12-24% |
| Lime | 3-10% |

| | |
|---|---|
| -continued | |
| Free water | 3-5% |

The amount of water which is chemically bound as hydrates in this powder prior to product formation can be estimated from the chemical compounds present. Assuming that 90% of the lime is hydrated, that CaSO$_x$ is 65:35 sulfite to sulfate and that the sulfate is 50:50 dihydrate to hemihydrate, the chemically bound water can vary from about 1.5 to about 13% by weight of the product. The preferred analysis for low sulfur western coal ash products is about 2 to 5% bound water.

The first collected portion of powder 8 from the bottom of the drying chamber may differ somewhat in composition from the second portion of powder 9 collected in the particulate removal device. In a typical operation, material collected from the bottom of the drying chamber contains about 70% by weight fly ash, 13% by weight calcium sulfite, 7% by weight calcium sulfate, 5% by weight unreacted lime, and 5% by weight free water. Material collected from the particulate collection device, (e.g., a bag house) contains about 72% by weight fly ash, 15% by weight calcium sulfite, 9% by weight calcium sulfate, 1% lime and 3% free water.

The powder from a dry scrubbing operation can be stored in dry form, e.g., on the order of weeks or months, and still be utilized according to the process of the present invention. It is preferred, however, to process this powder soon after it is formed in the scrubbing operation to take full advantage of the nascent cementitious properties of this material.

Both the first and second collected portions of powder from the flue gas cleaning operation, as detailed in the foregoing, contain latent cementitious materials as they normally exit the process. It may be desirable, in some cases, to further develop the latent bonding potentials before using the dry scrubber powder according to the present invention. It is possible by adjusting the scrubber parameters to achieve this objective. Referring again to FIG. 1, a separate conditioning step 11 optionally can be used to enhance the cementitious properties of the fly ash-containing dry scrubber waste powder 12. In such a separate conditioning step the primary objectives are to convert sulfites to sulfates and to at least partially dehydrate sulfates or sulfites. The preferred process for accomplishing these objectives is subjecting the powder from the scrubber to a mild heating process. This heating process can be suitably carried out, e.g., in a fluidized bed, at a temperature from about 120° C. to about 350° C. While either oxidizing or reducing conditions can be employed during this heating, a mild oxidizing atmosphere is preferred. The heating can be carried out in a continuous manner for a period sufficient to complete the dehydration reaction as is known. Typically, heating at about 140° C. for about 10 minutes is effective to achieve the objectives of this treatment. The exact parameters necessary to effect this conditioning step will, of course, vary with the specific powder produced in the scrubber.

Applicant has found that fly ash-containing dry scrubber waste powders differ substantially in reactivity (i.e., with water) depending inter alia on the type of coal burned, the free lime content of the waste powder, the form and quantity of the sulfur oxide absorption reaction products, the particle size distribution, the carbon content and the like. In general, applicant has discovered that these various waste powders can be classified into three levels of activity: highly reactive, moderately reactive, and nonreactive. Determination of the proper classification for any given powder is essential to the process of the present invention since subsequent processing steps will vary as described below for each powder type. The powder classification can be effected by the Niro Heat Generation (NHG) test. In this test procedure a representative one liter sample of material to be tested is cooled to ambient temperature, if necessary, avoiding excessive atmospheric contact. The sample is then poured into a 2×4 inch mold under loose bulk conditions. 66 milliliters of water at 70°–75° F. is added to the sample in the mold and therein hand mixed with a spatula for approximately one minute to provide a mixture in which the water is uniformly distributed. The sides of the mold are then tapped with a spatula handle 25 times. The mold containing the sample is then placed in a Dewar flask equipped with a stopper through which the lubricated stem of a thermometer is inserted. The thermometer stem should contact the bottom of the mold. The thermometer assembly operation should take 30 seconds after which the initial temperature of the composition is read and recorded. The temperature observation is repeated at 5 minute intervals, stopping when four successive readings indicate no additional temperature rise. The NHG values (in °F. of temperature rise, rounded to the nearest degree) for each of the three types of powders are shown below.

| Highly reactive | 7 or more |
| Moderately reactive | 2 to 6 |
| Nonreactive | 1 or less |

In the next step of the process of the instant invention, shown generally at 13, the optionally conditioned waste material 14 is contacted with a predetermined amount of water 15. The amount of added water, and the mode of adding water are extremely important in accomplishing the process of the present invention. Large slugs of water preferably should be avoided. One suitable manner of effecting the water addition step is by the use of a spray directed into a mass of powder. Water addition is preferably carried out at ambient temperatures although somewhat higher or lower temperatures can be employed.

The amount of added water used is critical to achieving the desired properties of the materials of the present invention. Powders from different sources have different water requirements due to the variabilities of the reactivity and physical characteristics of the powder (which vary with the nature of the fly ash and scrubber operating conditions). The primary basis for selecting the proper amount of added water for any given powder is the dry density which the powder/water mixture yields. Dry density is defined as the dry weight per unit volume for the compacted mixture immediately after compacting.

According to the process of this invention the range of predetermined water additions is selected by first determining the optimum moisture content of the powder/water mixture according to a procedure based on ASTM C-593. For this purpose the optimum moisture content is that which gives the highest dry density on a plot of moisture content vs. dry density. The specific procedure for this determination is as follows:

A number of compositions of differing moisture levels are prepared in the form of cylindrical specimens. These specimens are prepared by compacting a powder/water mixture in a Proctor cylindrical mold in accordance with the procedures of ASTM Method C-593, Section 8.4, with the following modifications:

(1) Mixing was accomplished using a Hobart type N-50 mixer. Specifically, the mixing procedure is as follows. The desired volume of water is poured into the mixing bowl and the dry powder material is subsequently poured into the bowl with the mixer operating at 140 rpm. The pouring of this dry powder is completed in about 10 seconds. The mixing is continued at 140 rpm for another 20 seconds (total of 30 seconds since beginning of addition). The mixer is then stopped and the paddle is removed and the sides of the bowl are scraped completely. Mixing at 285 rpm for 60 additional seconds is then effected.

(2) The compaction is effected with the 5.5 pound hammer with a controlled 12 inch drop; the specimens are compacted in three layers of relatively uniform heights with 25 blows per layer.

In the next step of the optimum moisture/density determination, the finished Proctor cylinder specimens are weighed and the wet and dry densities are calculated as follows:

$$W_M = \frac{30(A - B)}{454}$$

$$W_D = \frac{W_M}{M + 100} \times 100$$

Where:
 $W_M$ = Wet density, in pounds per cubic foot of compacted material.
 $W_D$ = Dry density, in pounds per cubic foot of compacted material.
 M = Percentage of water added to dry material.
 A = Weight of container and wet material, in grams.
 B = Weight of container, in grams.

The moisture content is then plotted against the dry density in pounds per cubic foot to yield a moisture/density curve for the particular powder material. It has been found that the waste powders utilized according to the process of the present invention demonstrate clearly defined maximum density values with varying moisture contents. Accordingly, optimum moisture content can be determined by selecting the moisture level which corresponds to the maximum obtainable dry density.

In performing the water addition step of the present invention the selected water amount should be from about 60% to about 125% of the optimum moisture content as described above. Typically, the optimum moisture contents for the various types of waste powders described above will fall in the range of from about 20 to 30% by weight of dry powder.

From a practical standpoint, mixtures cannot be satisfactorily handled when less than approximately 60% or more than approximately 125% of the water needed of optimum moisture content is added. Problems generated by operating outside this range include dusting problems during the handling of drier mixes and stickiness or plasticity of wetter mixes. In an alternative embodiment of the process of the present invention 60% or more of the water needed for optimum moisture content can be added at an initial processing site, with the remainder added at the placement site as described hereinafter.

In the next step of the process of the present invention the powder/water mixture 16 is subjected to mixing shown at 17. In general, the purpose of the mixing step is to ensure the uniform distribution of water throughout the mixture. For batch type operations this mixing can take place in any suitable equipment such as paddle mixers, pug mills, and the like. Mixing is preferably carried out at ambient temperatures, although somewhat higher or lower temperatures can be employed.

The effectiveness and duration of the mixing operation must be carefully controlled in order to provide a mixture which is suitable for producing the preferred products according to the present invention. Mixing effectiveness is a term which is intended to relate the nature and amount of mixing, e.g., the equipment type, speed of operation, and the like. As an example, when mixing a powder/water mixture containing above optimum moisture contents as described above, in a paddle type mixer operating at low speeds (e.g., about 140 rpm) the following observations can be made. After about 20 to 30 seconds of mixing, the water appears to be relatively uniformly distributed over the surface of the powder and some small soft lumps ($\frac{1}{4}$" to $\frac{3}{8}$") may have formed. With additional mixing the mixture begins to form relativley large agglomerates which render the mixture unsuitable for producing products according to the present invention. While these large agglomerates can be broken down with extended mixing times, the resulting product is generally a very sticky, plastic mass which cannot easily be removed from the mixer let alone utilized according to the present invention.

Accordingly, the mixing should be carried out at an effectiveness and for a duration sufficient to provide a uniform powder/water mixture, without the formation of large agglomerates or a sticky plastic mass. For paddle mixers this critical mixing time is generally less than about 60 and preferably less than about 30 seconds. The effect of mixing effectiveness and duration is somewhat different for mixtures having differing moisture contents. Mixtures having above optimum moisture contents present immediate problems in that overmixing causes plastic masses to form and these masses harden rapidly. When using optimum moisture content, the effects of overmixing are not immediately apparent, but as described hereinafter, some adverse effects can be observed after several hours of storage. Mixing effects are not as critical for below optimum moisture content mixes.

Addition and distribution of water also can be enhanced effectively by precontacting the powder with steam under conditions favoring condensation of water throughout the mixture.

In the next step of the process of the present invention the powder/water mixture 18 is transported shown at 19 to a suitable utilization site, e.g., a landfill site, where the material is positioned and compacted in a desired location and configuration. The elapsed time between the water contacting and compaction steps must be carefully controlled to achieve the objectives of the present invention. For each powder type there is a critical maximum allowable delay time between these steps. If longer periods of delay are encountered, unacceptable products result. For highly reactive powders it is essential that transportation and handling be completed within about 1 hour to about 24 hours after initial water addition. Somewhat longer transportation/storage times can be tolerated when using less reactive powder types. Transportation can be accomplished, for example, by material handling devices such as belt conveyors and the like or by suitable land transportation means such as trucks or railroad cars.

The manner of treatment at the utilization site will vary somewhat with the nature of the utilization objective. The products of the present invention find utility, inter alia, as compacted landfill materials; as structural landfill materials such as enbankments and the like; other structural materials such as blocks; and as components in the manufacture of roadbase compositions.

In the next step of the process of the present invention the transported mixture 20 is placed (at 21) in the desired configuration at the utilization site. This is best accomplished using conventional earth moving equipment. Typically, the material is placed in lifts or layers with compaction as described below being effected between the placement of successive lifts. The total depth of the placement and of each lift is determined by the site topography and the compaction objectives in light of available compaction equipment.

An optional processing step may comprise the addition of water to the transported mixture. This step may be accomplished by mixing additional water 22 with the transported mixture before its placement, or by applying water 23 to the placed material. This in-place water addition can take the form of spraying either before or after compaction of the material as described below. When in-place precompaction water addition is employed, it is generally desirable to distribute the water into the placed material, e.g., by tilling. Under some circumstances mere percolation is sufficient to distribute the added water through an in-place material.

Re-addition of water at the utilization site may be effected for two separate reasons. Firstly, as described above, it may be desirable to add only a portion of the desired water (i.e., 60% or more of op*imum moisture content) at the mixing step. This may enhance the storage characteristics of powder/water mixture and may avoid some of the problems associated with overmixing. In addition, the use of on-site water addition may also be used to facilitate on-site handling and to provide on-site dust control. In this type of situation the amount of on-site water addition is that sufficient to bring the total water up to the desired predetermined amount.

A second possible reason for the addition of on-site water is to rehabilitate powders that have been subjected to unduly long periods of storage. As shown in Example 1, this second water addition can result in regain of properties lost during storage. Under these circumstances enough water should be added to replace the water which has been lost to physical and chemical drying of the mixture. Typically, water additions of about 5 to 10% by weight of the wet powder mixture may satisfy these requirements.

In the next step of the process of the present invention the placed material 24 is subjected to a compaction step shown at 25. Compaction is effected by the application of a suitable load to the surface of the in-place material. Typically, the compaction can be accomplished using conventional equipment such as steel wheel rollers, sheeps' foot rollers, and even heavy earth moving equipment. Tamping equipment of known designs may also be used.

The amount of compaction imparted to the in-place material should be sufficient to compact this material to a dry density of at least about 70% of the laboratory dry density. While this level of compaction is sufficient for landfill disposal applications, at least about 80% of laboratory dry density is desirable for structural landfill applications (e.g., embankments). Densities of at least 90% of the laboratory dry density values are preferred when using the waste material of the present invention in roadbase compositions. Since laboratory dry densities of typical waste materials according to the present invention range from about 80 to 100 pounds per cubic foot, and field values are generally less, the typical compacted densities for various applications are about:

| landfill | 55 to 95 pcf |
|---|---|
| structural landfill | 65 to 95 pcf |
| roadbase compositions | 70 to 95 pcf |

In the final step of the process of the present invention the compacted material 26 is subjected to a curing step shown at 27. Curing of the placed compacted materials is temperature sensitive but these materials exhibit adequate curing rates over a wide range of temperature conditions. If curing reactions are interrupted by exposure to low temperatures (e.g., during winter months) the curing will resume when warmer conditions return.

The products of the present invention have excellent strength and permeability characteristics which vary somewhat depending on the nature of the waste powders employed. Typically, when compacted at optimum moisture content as described above, and cured at 73° F. for 28 days, the products of this invention exhibit compressive strengths of at least 25 psi. Typical strengths of compacted masses based on the various powder types are as follows:

| Highly reactive | = greater than 800 psi |
|---|---|
| Moderately reactive | = 100 to 800 psi |
| Nonreactive | = 25 to 100 psi |

In general the desired properties for landfill material will vary depending on site and regulatory requirements. Roadbase composition applications typically require greater strengths, i.e., on the order of at least about 400 psi.

Permeability values of disposed waste materials are an environmental concern, since highly permeable wastes can release undesirable and potentially toxic materials to the groundwater system. Surface water quality can also be affected. Low permeability wastes effectively preclude the major impacts of interaction of the waste material with ground and surface waters. While the performance characteristics may vary depending on site requirements, permeability values of greater than $1 \times 10^{-5}$ cm/sec. suggest that an underdrain and permeate collection system should be considered if undesirable or potentially dangerous materials might be leached from the waste. Permeabilities of compacted materials of the present invention are less than $1 \times 10^{-5}$ cm/sec. and typically range from about $5 \times 10^{-6}$ to less than $1 \times 10^{-7}$ cm/sec.

Nonreactive or moderately reactive powders may require cementitious additives in order to achieve the desired minimum in-place product characteristics. Among the cementitious additives which can be utilized according to the process of the present invention are Portland cement, lime, calcium sulfate hemihydrate, water glass, and synthetic resins and latices. Additive amounts of cementitious materials should be used at a minimum value necessary to achieve the desired product property characteristics. Typically, these additives are employed at levels of from about 2 to 15% by weight of the nonreactive or moderately reactive powders.

Other additives normally employed in cementitious materials may also be utilized in the compositions of the present invention in conventional amounts and for conventional purposes as long as these additives are not incompatible with or harmful to the compositions of this invention. As examples of such additives, are set accelerators, such as sodium carbonate, sodium silicate, sodium metasilicate, sodium hydroxide and the like. Typically, set accelerators are employed at levels of up to about 5% based on the dry weight of the powders.

One preferred utilization of the product of the present invention is in the formation of roadbase compositions. In this application the more reactive powder materials may be used per se by simply placing and compacting them in the appropriate configuration. It may be desirable in some cases to include aggregate materials in conventional amounts with the powders of the present invention in forming roadbase compositions. Aggregate addition is required when the powder of the present invention is in the nonreactive class. Typically, the powders of this invention will comprise from about 6 to 30% by dry weight of the powder/aggregate mix. One useful source of gravel for use as an aggregate with the powder of the present invention is that produced according to the process described in commonly assigned, copending application Ser. No. 184,069, entitled "Shaped Cementitious Products", filed Sept. 4, 1980, in the names of Webster, Veltman, Buschmann and Rasmussen.

The following examples are intended to illustrate more fully the nature of the present invention without acting as a limitation on its scope.

EXAMPLE 1

This Example demonstrates the novel means of handling a highly reactive powder material for disposal as a compacted landfill, and the properties of such a composition. A sample of material representing the waste product from a dry scrubber flue gas desulfurization operation, identified as NAL 8427, and having a NHG value of 16° F., when tested as described supra, was provided.

The criticality of water content in disposal materials was demonstrated by mixing, compacting, and curing a series of powder/water mixtures. In each case, the water was added to the bowl of a laboratory type N-50 Hobart paddle mixer, and the powder was then added over a 10 second period while the mixer was operated at first speed (140 rpm). Mixing continued at first speed for a total of 30 seconds, after which the bowl was scraped down and mixing resumed at second speed (285 rpm) for another 60 seconds. Total mixing time was 90 seconds. The amount of water used was varied such that the range of water content bracketed the amount needed to produce the maximum dry density in compacted cylinders (the "optimum moisture" content). Four inch diameter Proctor cylinders were compacted immediately after mixing using a 5½ pound hammer with a 12 inch controlled drop in three layers, each layer receiving 25 drops of the hammer. As described above, the procedures generally follow those described in ASTM Method C-593, Section 8.4, with modifications made to the specified mixing and compaction procedures such that the final product is similar to that which could be expected in a compacted landfill. The compressive strengths were measured, after curing in field containers, by immersing the cylinders in water for four hours, and draining, capping, and breaking the cylinders in compression on a testing machine such as a Tinius Olson Compressive Strength Tester within one hour after removal from the water bath. The densities and compressive strength results are shown in Table 1:

TABLE 1

| | Water Added, % of Dry Weight | | | | |
|---|---|---|---|---|---|
| | 22 | 25 | 28 | 29 | 30 |
| Dry Density, lb/cu ft | 78.9 | 83.8 | 87.5* | 88.2* | 86.1* |
| Compressive Strength, lb/sq in | | | | | |
| 28 days at 73° F. | 1210 | 2261 | 2564 | 2643* | 2464* |

*average of two cylinders

The criticality of water content was confirmed and the effect of higher water content shown by additional tests done at optimum moisture and at +5% water, as shown in Table 2. In these tests, mixing and compacting were performed in the same manner as those compositions described in Table 1, except that the 34% water composition was mixed at first speed (140 rpm) for the entire period, as the mixer could not handle the load at second speed (285 rpm).

TABLE 2

| | Water Added, % of Dry Weight | | |
|---|---|---|---|
| | 24 | 29 | 34 |
| Dry Density, lb/cu ft | 81.3* | 87.9* | 82.0* |
| Compressive Strength, lb/sq in | | | |
| 7 days at 100° F. | 1356* | 1688* | 1296* |

*average of two cylinders

The results in Table 1 and Table 2 illustrate the critical relationship between water content and performance of the disposal mixtures.

The effect of time delays between mixing and compaction of highly reactive powders was also demonstrated by mixing, compacting, and curing a series of powder/water mixtures. In all cases, the mixing and compaction were performed in the same manner as those compositions described in Table 1, except that the amount of time between the mixing and compaction of the powder/water mixtures was incrementally varied. All mixtures were stored in sealed containers at 73° F. during the delay period; however, the apparent free moisture dropped with aging, presumably due to the water being chemically bound by hydration reactions. Results are shown in Table 3.

TABLE 3

| | Time Delay, hours | | | | |
|---|---|---|---|---|---|
| | 0 | 1 | 2 | 4 | 24 |
| Wet Density, lb/cu ft | 113.0* | 99.8* | 92.3* | 90.3* | 84.5* |
| Dry Density, lb/cu ft | 87.6* | —** | —** | —** | —** |
| Cylinder Quality*** | Excellent | Fair | Poor | Poor | V. Poor |
| Compressive Strength, lb/sq in | | | | | |
| 7 days at 73° F. | 1450* | 443* | 185* | 162* | 103* |

*average of two cylinders
**not calculated due to uncertainty as to the amount of free (unreacted) moisture present.
***factors used in determining cylinder quality include green strength and uniformity of texture and porosity The delay mixtures were quite lumpy, containing soft friable lumps at 1 hour, large friable lumps at 2 to 4 hours, and large firm lumps and hard grains that could not easily be broken apart by hand at 24 hours. The larger lumps were broken down to 1" to 2" maximum size before compaction in all cases. The results in Table 3 show marked reduction in compacted density and strength, even after only 1 hour of delay.

The effect of adding additional water to previously wet storage material was then demonstrated. As noted, the mixtures described in Table 3 appeared to be drying out, due to chemical absorption of the mixing water, during the delay period. Additional water was added to approximate the optimum moisture content to portions of the 2 hour, 4 hour, and 24 hour delay material by mixing the residue from each of the delay tests with 5 or 10% water by wet weight of residue for 30 seconds at slow speed (140 rpm) in the Hobart N-50 mixer. Table 4 summarizes these results.

TABLE 4

| | Time Delay, hours | | |
|---|---|---|---|
| | 2 | 4 | 24 |
| Water added, % of wet weight | 5 | 5 | 10 |
| Cylinder quality | Good | Good | Good |
| Wet Density, lb/cu ft | 108.0 | 107.2 | 107.9 |
| Compressive Strength, lb/sq in | | | |
| 7 days at 73° F. | 722 | 589 | 213 |

The results in Table 4 indicate that when using the above-described two-stage water addition wet densities approaching those obtained from immediate compaction with one stage addition can be realized, and that a considerable portion of the strength loss associated with storage is regained.

The criticality of the effectiveness and duration of mixing on the placement characteristics of the powder/water mixture was also demonstrated. The placement characteristics changed considerably and critically during an extended 90 second mixing period. This was particularly evident in further testing of the mixture containing 34% added water. In a smaller batch of material, such that the mixing capability of the Hobart N-50 mixer would not be exceeded, the particles of powder were barely wetted at about 25 to 30 seconds of mixing at slow speed (140 rpm); with continued mixing for 60 seconds at second speed (285 rpm), the composition gradually formed large wet agglomerates, and finally became a very plastic, sticky material. This material could not be used in landfill compositions of this invention, as this sticky material cannot be transported, placed or compacted as mixed. After two hours of sealed storage, the mix was a single hard lump that could not easily be broken apart and would not be suitable for damp disposal placement. Two additional powder/water mixtures were prepared at 34% and 29% water added, respectively, with only 30 seconds of mixing at slow speed (140 rpm). The resulting mixes were earth-damp materials that could be easily handled. After two hours of sealed storage, the mixes were easily compacted, resulting in well-formed cylinders, in contradistinction to the over-mixed composition described above. The 30-second mixing cycle was also used to prepare a mixture of 29% water for immediate compaction. Results including some values previously provided are presented in Table 5.

TABLE 5

| | Mixing Time, seconds | | | | | |
|---|---|---|---|---|---|---|
| | 90 | 30 | 90 | 30 | 90 | 30 |
| Water added, % of dry weight | 34% | 34% | 29% | 29% | 29% | 29% |
| Delay time | 2 hr. | 2 hr. | 2 hr. | 2 hr. | None | None |
| Wet Density, lb/cu ft | —* | 96.8 | 92.3*** | 92.1 | 113.0*** | 109.0 |
| Dry Density, lb/cu ft | —* | —** | —** | —** | 87.6*** | 84.5 |
| Cylinder quality | —* | Good | Poor | Good | Excellent | Excellent |
| Compressive Strength, lb/sq in 7 days at 73° F. | —* | 266 | 185*** | 245 | 1450*** | 1520 |

*mixture was not suitable for damp disposal placement due to pressure of a single hard lump
not calculated due to uncertainty as to the amount of free moisture present*average of two tests Comparison of the values for the 29% water mixes show comparable cylinder quality and strength with 30 seconds or 90 seconds mixing time, when the cylinders are compacted immediately. However, after a two-hour delay period, the short mixing cycle is superior in cylinder quality and strength. At 34% water the longer mix time resulted in a mixture that could not be stored for two hours whereas the shorter mix time yielded good cylinder quality and acceptable strength.

The results show that the mixing time of the powder/water mixtures is critical, with the best mixing time to allow storage prior to compaction being that required to just wet the particles.

EXAMPLE 2

This Example demonstrates the effect of curing temperatures on the rate of strength development in the powder/water mixtures. Additional cylinders were prepared using the same powder sample and the same mixing and compaction procedures described in reference to Table 1 of Example 1. Cylinders thus formed, 2 cylinders per test, were cured in sealed containers at various temperatures for 7 and 28 days, with results as shown in Table 6. Due to the mass curing effect in the landfill, the temperatures of all but the surface material are not expected to go below the temperatures shown in Table 6.

TABLE 6

| Curing Temperature, F. | Dry Density, lb/cu ft | Curing Age, days | |
|---|---|---|---|
| | | 7 | 28 |
| 140° F. | 87.5 | 1692 | Not Tested |
| 100° F. | 87.3 | 1662 | 2770 |
| 73° F. | 87.9 | 1450 | 2643 |
| 55° F. | 88.3 | 1180 | 1855* |

*Test performed on single cylinder

The results indicate that the reaction is temperature sensitive, but will proceed at an acceptable rate over a wide range of ambient temperatures.

EXAMPLE 3

This Example demonstrates the disposal concepts and performance characteristics as applied to a moderately reactive powder. A sample of material representing the waste product from a dry scrubber flue gas desulfurization operation, identified as Product No. 2157, and having a NHG value of 2° F., when tested as described supra, was provided.

A series of powder/water mixtures was mixed in the Hobart N-50 mixer, as described relative to the compositions in Example 1, Table 1. The disposal products were prepared at optimum moisture. Permeability values were obtained using the Corp of Engineers falling head permeability test, EM-1110-2-1906, Section VII-13. In this procedure, a Proctor cylinder is compacted in the same manner as the cylinders for the compressive strength test; however, the test cylinder is left in the compaction mold and cured for a fixed period of time prior to testing. At the desired testing age, the test cylinder is saturated with water and a head of water applied while the test cylinder is contained in a permeameter apparatus. The apparatus allows the careful measurement of water flow through the saturated test cylinder. Results are shown in Table 7.

TABLE 7

| Water Added, % by dry weight | 20 |
|---|---|
| Dry Density, lb/cu ft | 102 |
| Compressive Strength, lb/sq in | |
| 28 days at 73° F. | 380 |
| Permeability, cm/sec | |
| 28 days at 73° F. | $8.1 \times 10^{-6}$ |

The results of Table 7 show that materials with adequate landfill properties can be made directly from the moderately reactive powder.

EXAMPLE 4

This Example demonstrates the use of cementitious additives as applied to a moderately reactive powder. A sample of material representing the waste product from a dry scrubber flue gas desulfurization operation, identified as Product No. 6017, and having a NHG value of 2° F., when tested as described supra, was provided.

A series of powder/water mixtures was mixed in the Hobart N-50 mixer, as described relative to the compositions in Example 1, Table 1, except that the mixtures were made both with and without a 5% by dry weight of powder addition of Type I Portland cement. The disposal products were prepared at estimated optimum moisture. Permeability cylinders were made for all mixtures. Results are shown in Table 8.

TABLE 8

| Additive Used (5%) | None | Cement |
|---|---|---|
| Water Added, % by dry weight | 22 | 26 |
| Dry Density, lb/cu ft | 82 | 82 |
| Compressive Strength, lb/sq in | | |
| 7 days at 73° F. | —¹ | 63 |
| 28 days at 73° F. | 113 | 311 |
| Permeability, cm/sec | | |
| 28 days at 73° F. | $8.1 \times 10^{-7}$ | $2.7 \times 10^{-6}$ |

¹cylinder failed during soaking period prior to test

The results indicate the early hardening characteristics of the disposal product made from moderately reactive powders can be significantly enhanced by the addition of 5% Type I Portland cement.

EXAMPLE 5

This Example demonstrates the disposal concepts and the permeability of the compacted material as applied to a highly reactive powder. A sample of material representing the waste product from a dry scrubber flue gas desulfurization operation, identified as Product No. 2250, and having a NHG value of 26° F., when tested as described above, was provided.

Two powder/water mixtures were mixed at optimum moisture in the Hobart N-50 mixer, as described relative to the compositions in Example 1, Table 1. Proctor cylinders were compacted in the same manner as the cylinders for compressive strength tests, in one case using 25 blows of the hammer per layer, and in the other case using only 20 blows per layer to demonstrate the effect of reduced compactive effort. Permeability tests were conducted as described in Example 3, and results are provided in Table 9.

TABLE 9

|  | Compactive Effort | |
| --- | --- | --- |
|  | 20 Blows | 25 Blows |
| Water Added, % by dry weight | 20 | 20 |
| Dry density, lb/cu ft | 91 | 102 |
| Permeability, cm/sec |  |  |
| 7 days at 100° F. | $2.0 \times 10^{-6}$ | Could not saturate[1] |
| 28 days at 100° F. | $4.6 \times 10^{-7}$ | Could not saturate[1] |

[1]indicates permeability below $1 \times 10^{-7}$ cm/sec

The results show that materials with excellent permeability characteristics can be made from the highly reactive powder.

EXAMPLE 6

This Example further demonstrates the disposal concepts and performance characteristics as applied to a nonreactive powder. A sample of material representing the waste product from a dry scrubber flue gas desulfurization operation, identified as Product No. 4037, and having a NHG value of 0° F. when tested as described above, was provided.

Five powder/water mixtures were mixed at approximate optimum moisture in the N-50 Hobart mixer, as described relative to the compositions in Example 1, Table 1. A reference mixture, with no cementitious additives, and four mixtures containing additives were included, as follows:

| Reference mix | No additives |
| --- | --- |
| Additive A | 10% Hydrated Lime |
| Additive B | 5% Type I Portland Cement |
| Additive C | 1% Sodium Carbonate |
| Additive D | 3% Sodium Metasilicate (anhydrous) |

All additive percentages are on the basis of the percent of total dry materials (powder and additives) present in the mixtures. The test results, based on two cylinders per test, are presented in Table 10.

TABLE 10

|  | Reference Mix | Additive | | | |
| --- | --- | --- | --- | --- | --- |
|  |  | A | B | C | D |
| Water Added, % by dry weight | 20 | 20 | 20 | 20 | 20 |
| Dry Density, lb/cu ft | 83.7 | 83.1 | 84.3 | 84.3 | 83.7 |
| Compressive Strength, lb/sq in |  |  |  |  |  |
| 28 days at 100° F. | 12 | 55 | 72 | 38 | 31 |

Permeability tests were completed on the compositions including Additives A and B, with results of $1.6 \times 10^{-6}$ and $2.8 \times 10^{-6}$ cm/sec respectively after 28 days of curing in sealed containers at 100° F.

The results show that materials with adequate landfill properties can be made from the nonreactive powder.

EXAMPLE 7

In an example of typical use of the products in a roadbase application, the waste product from a dry scrubber flue gas desulfurization operation, having a NHG value of 10 when tested as described above, is fed from a dry bulk storage bin and mixed in a double shaft pugmill, with predetermined quantities of water and an aggregate material. The aggregate is a gravel, crushed rock, or synthetic material meeting state highway requirements for aggregate-cement base course or aggregate-lime-pozzolan base course such as Pennsylvania Form 408, Section 321, and the relative proportion of powder to aggregate, usually in the range of 6 to 30% powder by total dry weight of powder and aggregate, has been selected by evaluating the performance characteristics of a range of powder-aggregate combinations, each tested at optimum moisture content. The selected powder-aggregate combination depends on desired performance, and on the relative availability and cost of the materials. The water admixed in the pugmill is between 90 and 120% of the optimum moisture content analytically determined for the powder-aggregate combination. The pugmill mixed material, after a mixing time of approximately 5 to 20 seconds, is discharged either directly to an open truck or to a stockpile where it is loaded into trucks or other suitable transportation equipment, is transported to the placement site, and spread to a uniform depth such that the compacted thickness of the base material is a preselected thickness in the range of approximately 4" to 12". Standard compaction devices are utilized to produce a base with a dry density at least equal to 90% of the maximum laboratory dry density corresponding to the optimum moisture content, with the compaction step completed within four hours from the completion of mixing. Shorter times, such as 1 to 2 hours, are required for more reactive powders, and longer times, such as 24 hours or more may be used for less reactive powders. The compacted base material is immediately overlain, if desired, with a suitable combination of seal cost, binding and wearing courses, usually comprising one or more bituminous paving compositions. The roadway is opened to normal traffic immediately after completion of the wearing course. After three months of field curing, a cylindrical core taken from the base material has a strength of 800 lb/sq in.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A process for preparing a cured compacted product from dry flue gas scrubbing waste materials, said process comprising the steps of:
    (a) providing a substantially dry fly ash-containing powder obtained from the dry scrubbing of fly ash-containing flue gas with lime, said fly ash-containing powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof;

(b) contacting said fly ash-containing powder with a predetermined amount of water to produce a powder/water mixture;

(c) mixing said powder/water mixture in a manner and for a time sufficient to produce a uniform distribution of said water without the formation of large agglomerates or a sticky plastic mass;

(d) placing said mixture in the desired configuration at the utilization site;

(e) compacting the placed mixture within a predetermined time subsequent to the contacting step to a density of at least about 70% of the laboratory dry density of said mixture; and (f) curing the compacted material in place to form said cured compacted product.

2. The process of claim 1 wherein said cured compacted product is a landfill material.

3. The process of claim 1 wherein said cured compacted product is a structural landfill material.

4. The process of claim 1 wherein said cured compacted product is utilized in a roadbase composition.

5. The process of claim 1 wherein said powder/water mixture is transported to said utilization site after said mixing step.

6. The process of claim 1 wherein said water contacting and said mixing steps are performed at said utilization site.

7. The process of claim 1 wherein said predetermined amount of water is from about 60% to about 125% of the water amount which produces maximum compacted dry density.

8. The process of claim 1 wherein said predetermined amount of water is from about 90% to about 120% of the water amount which produces maximum compacted dry density.

9. The process of claim 7 wherein said water amount which produces the maximum compacted dry density is from about 20% to about 30% by weight of the dry powder.

10. The process of claim 1 wherein said amount of water is from about 12% to about 37.5% by weight based on the dry powder.

11. The process of claim 1 wherein said amount of water is from about 18% to about 36% by weight based on the dry powder.

12. The process of claim 1 additionally comprising the step of contacting said powder/water mixture with additional water at said utilization site.

13. The process of claim 12 wherein said mixture is contacted with said additional water prior to placement.

14. The process of claim 12 wherein said mixture is contacted with said additional water after placement.

15. The process of claim 1 wherein said powder/water mixture is mixed for a period of less than about 60 seconds.

16. The process of claim 1 wherein said powder/water mixture is compacted to a density of at least about 80% of the laboratory dry density of said mixture.

17. The process of claim 1 wherein said powder/water mixture is compacted to a density of at least about 90% of the laboratory dry density of said mixture.

18. The process of claim 1 wherein said powder has a NHG value of about 7 or more.

19. The process of claim 1 wherein said powder has a NHG value of from about 2 to about 6.

20. The process of claim 1 wherein said powder has a NHG value of from about 1 or less.

21. The process of claim 1 wherein said predetermined time is less than about 24 hours.

22. A process for preparing a cured compacted product from dry flue gas scrubbing waste materials, said process comprising the steps of:

(a) providing a substantially dry fly ash-containing powder obtained from the dry scrubbing of fly ash-containing flue gas with lime, said fly ash-containing powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof, said powder having a NHG value of at least about 7;

(b) contacting said fly ash-containing powder with from about 90 to about 120% of the water amount which produces maximum compacted density;

(c) mixing the resulting powder/water mixture for a period of less than about 60 seconds.

(d) transporting said powder/water mixture to a utilization site;

(e) placing said mixture in the desired configuration at the utilization site;

(f) compacting the placed mixture within about 12 hours subsequent to said contacting step to a density of at least about 70% of the laboratory dry density of said mixture; and (g) curing the compacted material in place to form said cured compacted product.

23. The process of claim 22 wherein said utilization site comprises a landfill site and said mixture is placed as a landfill material.

24. The process of claim 22 wherein said fly ash-containing powder is contacted with from about 25 to about 35% by weight of water based on the dry powder.

25. The process of claim 1 wherein said fly ash-containing powder has a NHG value of less than 7 and further comprising the step of adding from about 2 to about 15% by weight of an additional cementitious material based on the dry weight of said powder.

26. The process of claim 25 wherein said cementitious material is selected from the group consisting of lime, Portland cement, calcium sulfate hemihydrate, water glass, and synthetic resins or latices.

27. A cured compacted product made from material which comprises a fly ash-containing powder, said powder comprising fly ash in intimate admixture with microparticulate crystallites of scrubber reaction materials selected from the group consisting of calcium sulfite, calcium sulfate, hydrates of calcium sulfite and calcium sulfate, calcium oxide, calcium hydroxide and mixtures thereof, said product exhibiting a compressive strength of at least about 25 psi, a compacted dry density of from about 55 to about 95 pounds per cubic foot, and a permeability of less than about $1 \times 10^{-5}$ cm/sec.

28. The product of claim 27 in the form of a compacted landfill material.

29. The product of claim 27 in the form of a compacted structural landfill material.

30. A roadbase composition comprising the product of claim 27.

31. The product of claim 30 additionally comprising aggregate materials.

32. The product of claim 27 wherein said compressive strength is from about 25 to about 100 psi.

33. The product of claim 27 wherein said compressive strength is from about 100 to about 800 psi.

34. The product of claim 27 wherein said compressive strength is above about 800 psi.

35. The product of claim 29 wherein said density is from about 65 to about 95 pounds per cubic foot.

36. The product of claim 30 wherein said density is from about 70 to about 95 pounds per cubic foot.

37. A cured compacted product made from a material which comprises a fly ash-containing powder having a NHG value of 7 or more, said powder comprising fly ash in intimate admixture with microparticulate crystallites of scrubber reaction materials selected from the group consisting of calcium sulfite, calcium sulfate, calcium oxide, calcium hydroxide and mixtures thereof, said product exhibiting a compressive strength of at least about 800 psi, a compacted dry density of from about 55 to about 95 per cubic foot, and a permeability of less than about $1 \times 10^{-5}$ cm/sec.

38. A cured compacted product made from a material which comprises a fly ash-containing powder having a NHG value of less than 7, said powder comprising fly ash in intimate admixture with microparticulate crystallites of scrubber reaction materials selected from the group consisting of calcium sulfite, calcium sulfate, hydrates of calcium sulfite, and calcium sulfate, calcium oxide, calcium hydroxide and mixtures thereof, and an additional cementitious material selected from the group consisting of lime, Portland cement, calcium sulfate hemihydrate, water glass, and synthetic resins or latices, said product exhibiting a compressive strength of at least about 25 psi, a compacted dry density of from about 55 to about 95 pounds per cubic foot, and a permeability of less than about $1 \times 10^{-5}$ cm/sec.

* * * * *